United States Patent [19]

Kotikovsky et al.

[11] Patent Number: 4,878,272
[45] Date of Patent: Nov. 7, 1989

[54] TONGUE ASSEMBLY

[75] Inventors: Alexander P. Kotikovsky, Oak Park, Mich.; Robert E. Tait, Midland, Canada

[73] Assignee: TRW Vehicle Safety Systems Inc., Lyndhurst, Ohio

[21] Appl. No.: 280,148

[22] Filed: Dec. 5, 1988

[51] Int. Cl.$^4$ .............................................. A44B 11/10
[52] U.S. Cl. ....................................... 24/196; 24/171; 297/468
[58] Field of Search .......... 24/196, 171, 68 R, 68 CD; 297/476, 468; 403/211

[56] References Cited

U.S. PATENT DOCUMENTS 1,292,298   1/1919   Fritsche ................................. 24/196
2,542,044   2/1951   Miller et al. ........................... 24/196
2,754,560   7/1956   Warner et al. ......................... 24/196
3,533,141  10/1970   Unai .
3,974,546   8/1976   Walker .
3,975,800   8/1976   Farlind .
4,152,026   5/1979   Takada .
4,386,452   6/1983   Stephenson .
4,551,889  11/1985   Narayan et al. .

FOREIGN PATENT DOCUMENTS 292510   8/1953   Switzerland ........................ 24/171

Primary Examiner—Victor N. Sakran
Attorney, Agent, or Firm—Tarolli, Sundheim & Covell

[57] ABSTRACT

A tongue assembly is used in a safety apparatus having a belt for restraining movement of an occupant of a vehicle. The tongue assembly includes a base having a flat leading end portion, a flat trailing end portion which is offset from and extends parallel to the leading end portion, and a connector portion extending between the leading and trailing end portions. The base has an opening which extends through the trailing end portion and through the connector portion. A locking bar spans the opening in the base. The belt extends through the opening, across the bar and back through the opening. When the tongue assembly is disconnected from a buckle, the belt extends through the tongue assembly so that the belt has first and second straight portions with the angle between the first and second straight portions of the belt being at least 154°.

12 Claims, 3 Drawing Sheets

TONGUE ASSEMBLY

BACKGROUND OF THE INVENTION

The present invention relates to a tongue assembly for use in a safety apparatus having a belt for restraining movement of an occupant of a vehicle.

Many known safety systems have a tongue assembly which is used to connect a belt with a buckle in order to restrain movement of an occupant of a vehicle. In these systems, the tongue assembly must be capable of transmitting relatively large forces in order to restrain an occupant of a vehicle against movement in the event of a sudden deceleration of the vehicle. Further, the tongue assembly should be thin to minimize interference with the occupant of the vehicle. In addition to being capable of transmitting large forces and being thin, the tongue assembly should be easy to manufacture in order to minimize the cost of making the tongue assembly.

When the tongue assembly is released from the buckle, the belt is wound onto a retractor. As the retractor winds the belt, both the belt and the tongue assembly are moved by the retractor. Since both the belt and the tongue assembly are moved by the retractor, the retractor must have a relatively strong wind-up spring, capable of exerting enough force on the belt to move the combined weight of the belt and tongue assembly. When the belt is in use, the relatively large force exerted by the retractor wind-up spring results in the belt being pulled across the torso of an occupant of the vehicle with a force the occupant may find to be objectionably large.

SUMMARY OF THE INVENTION

In accordance with the present invention, an improved tongue assembly is used in a safety apparatus having a belt to restrain movement of an occupant of a vehicle. The tongue assembly includes a base having a flat leading end portion, a flat trailing end portion which is offset from and extends parallel to the leading end portion, and a connector portion extending between the leading and trailing end portions. The base has an opening which extends through the trailing end portion and through the connector portion. A bar spans the opening in the base. The belt extends through the opening, across the bar, and back through the opening. When the tongue assembly is connected to a buckle, the belt wraps around the bar and is cinched in the tongue assembly. When the tongue assembly is disconnected from a buckle, the belt extends through the tongue assembly so that the belt has first and second substantially straight portions with an angle between the first and second straight portions being at least 154°.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A SPECIFIC PREFERRED EMBODIMENT OF THE INVENTION

Figure 1:
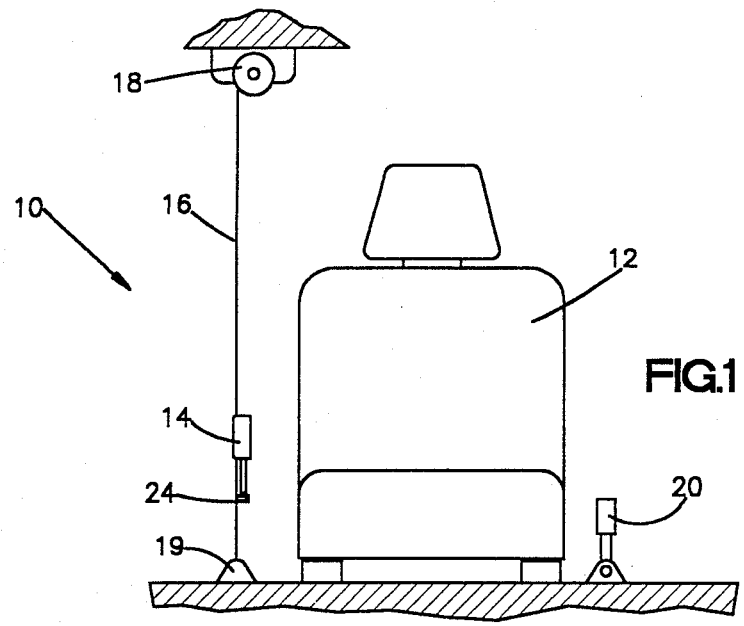
FIG. 1 is a schematic illustration of a vehicle seat and a safety apparatus for use in restraining movement of an occupant of the seat, including a tongue assembly in accordance with the present invention.

The present invention is illustrated in FIG. 1 as applied to a seat belt system 10 for use in restraining an occupant of a vehicle against movement relative to the vehicle. It should be understood that the invention could be applied to other belt systems. During operation of the vehicle, an occupant of the vehicle sits on a seat 12. The seat belt system 10 is engaged to restrain the occupant against movement relative to the vehicle and the seat 12. The seat belt system 10 includes a safety belt 16 attached at one end to a stationary mounting 19 on the frame of the vehicle adjacent one side of the seat. The opposite end of the belt 16 is attached to a retractor 18 secured to the vehicle. Intermediate its ends, the belt 16 passes through a tongue assembly 14, which is located against a stop 24 secured to the belt 16. When the seat belt system 10 is not in use, the belt 16 is wound on the retractor 18 and is oriented generally vertically on one side of the seat 12, with the tongue assembly 14 held up buy the stop 24.

To engage the seat belt system 10, the tongue assembly 14 is manually grasped and is pulled across the lap and torso of the occupant sitting in the seat 12. As the tongue assembly 14 is pulled across the lap and torso of the occupant of the seat 12, the tongue assembly moves along the belt 16, and the belt 16 is unwound from the retractor 18. When the belt 16 has been pulled sufficiently across the lap and torso of the occupant of the vehicle, the tongue assembly 14 is connected with a buckle 20. The buckle 20 is connected to the frame of the vehicle and is disposed on a side of the seat 12 opposite the stationary mounting 19.

Figure 2:
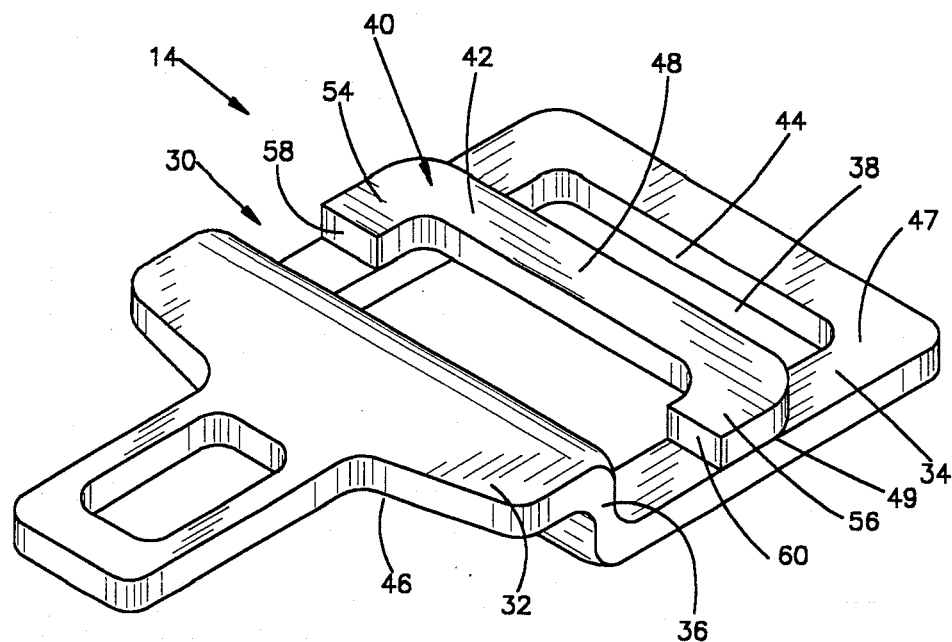
FIG. 2 is a perspective view of the tongue assembly of FIG. 1 illustrating the relationship between a base and a bar of the tongue assembly.

The tongue assembly 14 (FIG. 2) includes a base 30. The base 30 is made of one piece of metal of substantially uniform thickness. The base 30 has a flat leading end portion 32 to engage the buckle 20, a flat trailing end portion 34 which is offset from and extends parallel to the leading end portion, and a connector portion 36 extending between and interconnecting the leading and trailing end portions. The base 30 has an opening 38 which extends through the trailing end portion 34 and through the connector portion 36. An edge 44 of the trailing end portion 34 partially defines the opening 38.

A slidable bar 40 (FIG. 2) is disposed on the trailing end portion 34 of the base 30. The bar 40 has a first end portion 54 and a second end portion 56 interconnected by an intermediate portion 48 which spans the opening 38. The end portions 54, 56 and the intermediate portion 48 have an upper major flat side surface 42 and a lower major flat side surface 49. The lower flat side surface 49 engages and slides along a flat major side surface 47 of the trailing end portion 34 of the base 30. The belt 16 (FIG. 3) extends upwardly through the opening 38 in the base, across the upper flat side surface 42 of the bar, and back through the opening 38.

The first and second end portions 54 and 56 (FIG. 2) of the bar 40 project from the intermediate portion 48 of the bar 40 in a direction toward the connector portion 36 of the base 30. The first end portion 54 of the bar 40 has a rectangular side surface 58, and the second end portion 56 of the bar 40 has a rectangular side surface 60. The rectangular side surfaces 58 and 60 of the first and second end portions 54 and 56 can engage the connector portion 36 of the base 30. This limits the sliding movement of the bar 40 relative to the base 30 in a direction toward the left as viewed in the drawings.

Figure 6:
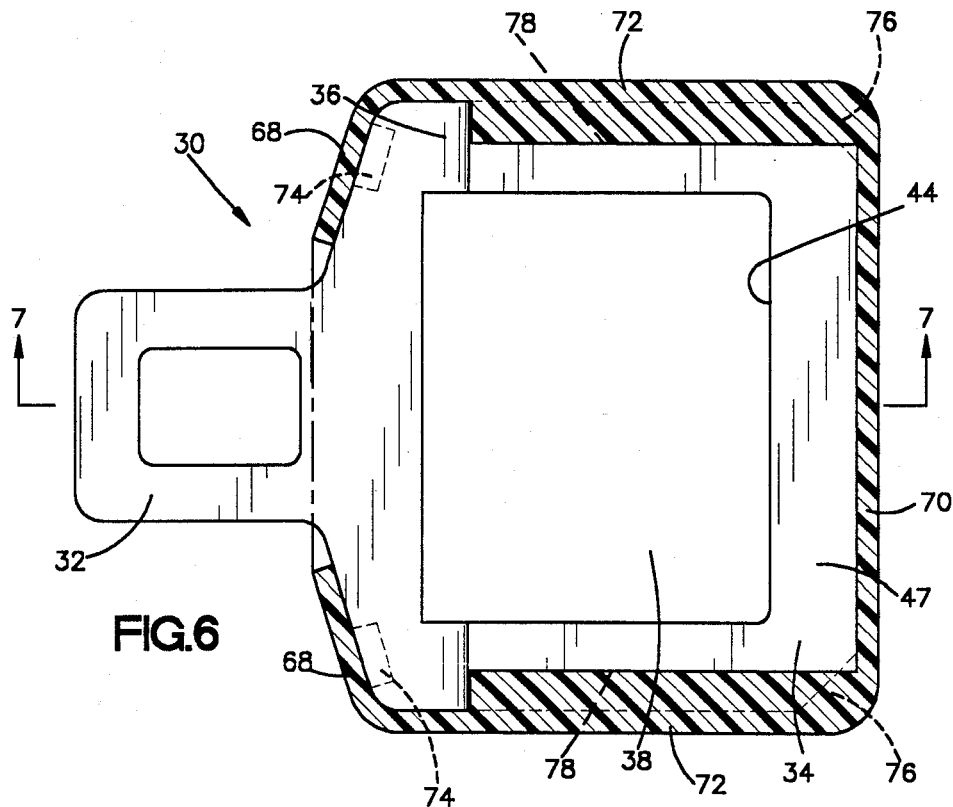
FIG. 6 is a sectional view of the tongue assembly of FIG. 5 taken along section line 6—6 of FIG. 5 and with parts removed.
Figure 7:
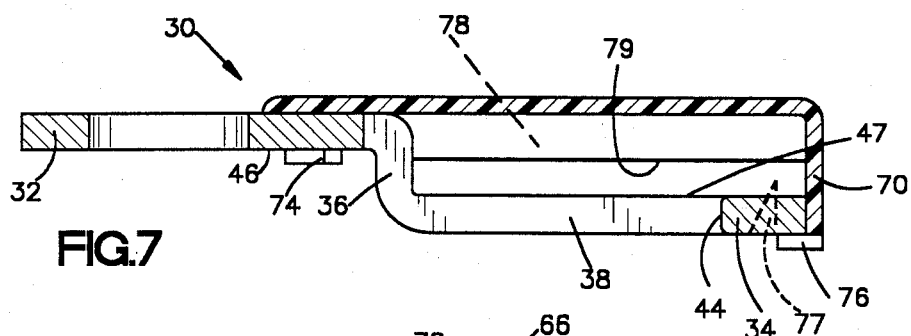
FIG. 7 is a sectional view taken along the line 7—7 of FIG. 6.
Figure 8:
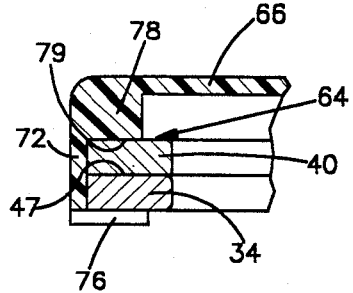
FIG. 8 is a sectional view taken along the line 8—8 of FIG. 5 and showing the side of the tongue assembly cover.

A cover 62 (FIGS. 3-8) is attached to the base 30. The cover 62 is preferably made from one piece of flexible hard plastic and includes a top 66, a pair of cover leading edge portions 68, a pair of cover side portions 72, and a cover trailing edge portion 70. A first pair of retaining tabs 74 (FIG. 6) extend from the cover leading edge portions 68. A second pair of retaining tabs 76 (FIG. 7) extend from the cover trailing edge portion 70.

The first pair of retaining tabs 74 on the cover 62 are located under the leading end portion 32 of the base 30, to secure the leading edge of the cover 62 to one end of the base 30. The second pair of retaining tabs 76 are located under the trailing end portion 34 of the base 30, to secure the cover 62 to the other end of the base 30. For assembly of the cover 62 to the base 30, a pair of cutouts 77 in the cover side portions 72, near the trailing edge of the cover 62, allow sufficient flexibility of the trailing edge portion 70 relative to the remainder of the cover to enable the retaining tabs 76 to be positioned under the trailing end portion of the base 30 after the tabs 74 are located under the leading end portion 32 of the base 30.

The cover 62 retains the bar 40 on the base 30 and guides movement of the bar 40 relative to the trailing end portion 34 of the base 30. In a preferred configuration, each side portion 72 of the cover 62 includes a widened portion 78 (FIG. 8) extending the length of the trailing end portion 34 of the base 30. Each widened portion 78 has a flat lower surface 79 which engages the upper flat major side surface 42 of the bar 40. On each side of the tongue assembly, the flat lower surface 79, the inside of the cover said portion 72, and the upper major side surface 47 of the trailing end portion 34, together define a groove 64 (see FIG. 5). In the preferred configuration shown, the grooves 64 on the sides of the tongue assembly 14 receive the first and second end portions 54 and 56 of the bar 40, and the end portions slide in the grooves 64 relative to the trailing end portion 34 of the base 30.

Figure 5:
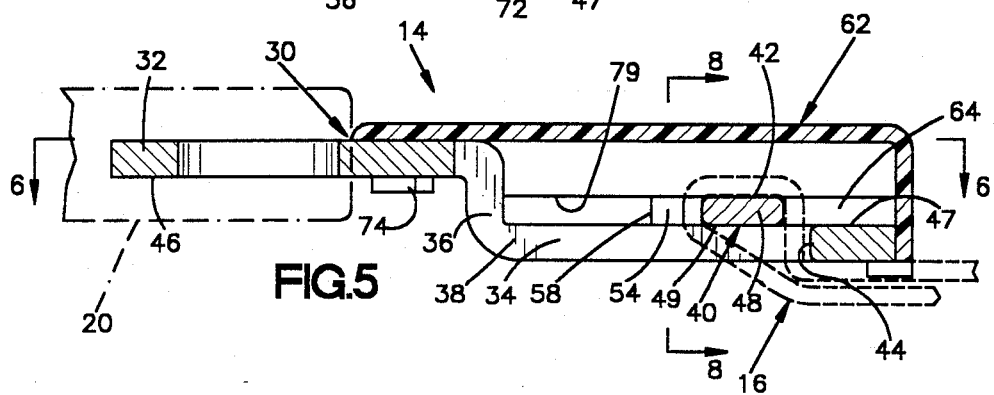
FIG. 5 is a sectional view of the tongue assembly of FIG. 1, generally similar to FIG. 3, with the tongue assembly in a condition in engagement with a buckle.

When the tongue assembly is pulled from its position shown in FIG. 1 in order to engage the buckle 20, the bar 40 is slid along the trailing end portion 34 of the base 30 by the belt 16 away from the leading end portion 32. When the leading end portion 32 of the base 30 engages the buckle 20, the intermediate portion 48 of the bar 40 and the trailing edge 44 grip the belt, as shown in FIG. 5. This prevents the tongue assembly 14 from moving relative to the belt 16. With the seat belt system thus engaged, restraining forces applied to the tongue assembly 14 by the belt 16 are transmitted to the metal bar 40, through the metal base 30 and to the buckle 20. Therefore, the restraining forces are transmitted through the relatively strong metal components of the tongue assembly.

Figure 3:
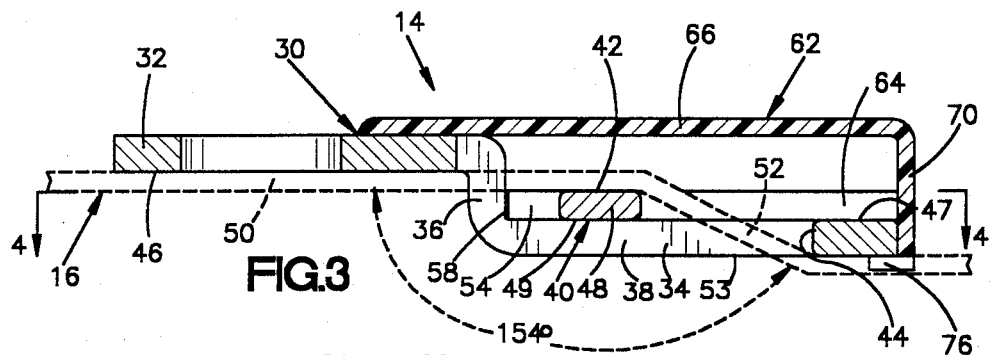
FIG. 3 is a sectional view of the tongue assembly of FIG. 1 in a disengaged condition illustrating a manner in which a safety belt extends through the opening in the base, across the bar and back through the opening in the base.
Figure 4:
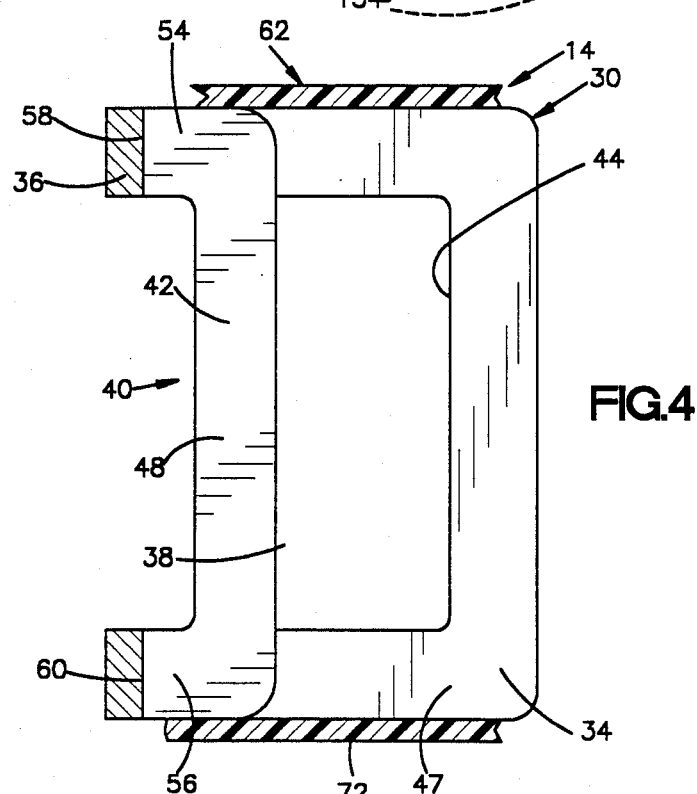
FIG. 4 is an enlarged fragmentary sectional view, taken generally along the line 4—4 of FIG. 3, illustrating the relationship between the bar and a connector portion of the tongue assembly of FIG. 1.

When the tongue assembly 14 is disengaged from the buckle 20, as shown in FIGS. 3 and 4, the bar 40 is slid to a position in which the rectangular side surfaces 58 and 60 engage the connector portion 36 of the base 30, to prevent any further movement of the bar 40 relative to the trailing end portion 34 of the base 30. A first straight portion 50 of the belt 16 extends from the bar 40 and is disposed in a side-by-side relationship with the leading end portion 32 of the base 30. A second straight portion 52 of the belt 16 extends from the upper flat said surface 42 of the bar 40 to the intersection of a major side surface 53 of the trailing end portion 34 and the trailing edge 44. The angle between the first and second straight portions 50 and 52 of the belt 16 is at least 154° (FIG. 3). With the angle between the first and second straight portions 50 and 52 being at least 154°, the tongue assembly 14 is able to slide on the belt 16 under the influence of gravity as the belt 16 is wound on the retractor 18. The tongue assembly 14 stops sliding along the belt when it again engages stop 24.

Since the tongue assembly 14 can move freely relative to the belt 16 when the belt system is disengaged, the amount of force which the retractor 18 applies to the belt 16, to rewind the belt 16, does not have to be large enough to move both the belt 16 and the tongue assembly 14. Therefore, the retractor 18 may use a relatively light wind-up spring.

Further, the flat major side surface 42 of the bar 40 and the major side surface 46 of the leading end portion 32 of the base 30 lie in substantially parallel planes which are spaced apart by a distance approximately equal to the thickness of the belt 16. Therefore, the overall thickness of the tongue assembly 14 is minimized.

From the above description of a preferred embodiment of the invention, those skilled in the art will perceive improvements, changes and modifications in the invention. Such improvements, changes and modifications within the skill of the art are intended to be covered by the appended claims.

Having thus described a preferred embodiment of the invention, we claim:

1. A tongue assembly for use in a safety apparatus in which a belt restrains movement of an occupant of a vehicle, said tongue assembly comprising:

a base having a flat leading end portion, a flat trailing end portion which is offset from and extends parallel to said leading end portion and a connector portion extending between said leading and trailing end portions, said base having an opening which extends through said trailing end portion and through said connector portion, said trailing end portion having a trailing edge which is spaced from said connector portion and which at least partially defines said opening; and a bar disposed on said trailing end portion of said base, said bar having first and second end portions and an intermediate portion extending between said first and second end portions of said bar and spanning said opening;

said bar having a first position disposed adjacent said trailing edge and a second position disposed adjacent said connector portion, and when said bar is in said second position the belt has a first straight portion extending from said bar and disposed in a side-by-side relationship with said leading end portion of said base and a second straight portion extending from said bar and disposed in engagement with said trailing edge.

2. A tongue assembly as set forth in claim 1 wherein the angle between said first and second straight portions of the belt is at least 154°.

3. A tongue assembly as set forth in claim 1 wherein said bar has a first major side surface facing away from said trailing end portion of said base, said trailing end portion of said base has a first major side surface facing away from said bar and intersecting said trailing edge and wherein said second straight portion of the belt extends from said first major side surface of said bar, through the opening in said base, to the intersection of said trailing edge and said first major side surface of said trailing end portion of said base.

4. A tongue assembly as set forth in claim 3 wherein the angle between said first and second straight portions of the belt is at least 154°.

5. A tongue assembly as set forth in claim 4 wherein said leading end portion of said base has a major side surface disposed in a first plane, said first major side surface of said bar is disposed in a second plane which extends parallel to the first plane, and the first and second planes are spaced apart by a distance which is substantially equal to the thickness of the belt.

6. A tongue assembly as defined in claim 5 wherein said bar has a second major side surface in sliding abutting engagement with a second major side surface of said trailing end portion of said base.

7. A tongue assembly as set forth in claim 4 wherein said first and second end portions of said bar project from said intermediate portion of said bar in a direction toward said connector portion of said base, said first end portion of said bar having first surface means for engaging said connector portion of said base to limit movement of said bar relative to said trailing end portion of said base, said second end portion of said bar having second surface means for engaging said connector portion of said base to limit movement of said bar relative to said trailing end portion of said base.

8. A tongue assembly as defined in claim 4 wherein said bar has a second major side surface in sliding abutting engagement with a second major side surface of said trailing end portion of said base.

9. A tongue assembly as defined in claim 8 wherein said base comprises one piece of metal of substantially uniform thickness.

10. A tongue assembly as defined in claim 3 and further comprising a cover attached to said base and having a top, a pair of leading edge portions, a pair of side portions and a trailing edge portion, each of said leading edge portions including retaining tab means for securing said leading edge portion of said cover to said base.

11. A tongue assembly as defined in claim 10 and further comprising second retaining tab means on said trailing edge portion of said cover for securing said trailing edge portion of said cover to said base.

12. A tongue assembly as defined in claim 11 wherein said cover includes surface means for slidably engaging said first and second end portions of said bar and for retaining said bar on said base.

* * * * *